(12) United States Patent
Zock

(10) Patent No.: US 11,898,505 B2
(45) Date of Patent: Feb. 13, 2024

(54) MANUALLY OPERATED CHOKE LEVER ASSEMBLIES INCORPORATING A CABLE SYSTEM

(71) Applicant: Richard Mellick Zock, Lapeer, MI (US)

(72) Inventor: Richard Mellick Zock, Lapeer, MI (US)

( * ) Notice: Subject to any disclaimer, the term of this patent is extended or adjusted under 35 U.S.C. 154(b) by 316 days.

(21) Appl. No.: 17/303,346

(22) Filed: May 27, 2021

(65) Prior Publication Data

US 2021/0381445 A1 Dec. 9, 2021

Related U.S. Application Data

(60) Provisional application No. 62/704,989, filed on Jun. 5, 2020.

(51) Int. Cl.
*F02D 11/02* (2006.01)
*B62M 27/02* (2006.01)
*F02M 1/02* (2006.01)

(52) U.S. Cl.
CPC ............ *F02D 11/02* (2013.01); *B62M 27/02* (2013.01); *F02M 1/02* (2013.01)

(58) Field of Classification Search
CPC ........... F02D 11/02; B62M 27/02; F02M 1/02

USPC ....................................................... 261/64.6
See application file for complete search history.

(56) References Cited

U.S. PATENT DOCUMENTS 4,007,647 A * 2/1977 Carlson ................ F02M 13/026
74/502

FOREIGN PATENT DOCUMENTS

GB 2151758 A * 7/1985 ................ F16C 1/16

* cited by examiner

*Primary Examiner* — Mahmoud Gimie
(74) *Attorney, Agent, or Firm* — Dunlap Bennett & Ludwig, PLLC

(57) ABSTRACT

An improvement to snowmobile choke lever lift pull on/off assemblies that use a manual style choke system incorporating a single or plurality cable system. The sockets that engage the cables of the cable system may be provide lateral or upper access ports. The choke lever at the distal end of the assembly may be movable from a first position to a second position by engaging the cable system, wherein an actuating element returns the choke lever to the first position. The present invention affords replacement of existing choke lever assemblies, wherein the choke lever and other components of the present invention may be made from metallic materials that increase the assembly's durability and halflife.

4 Claims, 4 Drawing Sheets

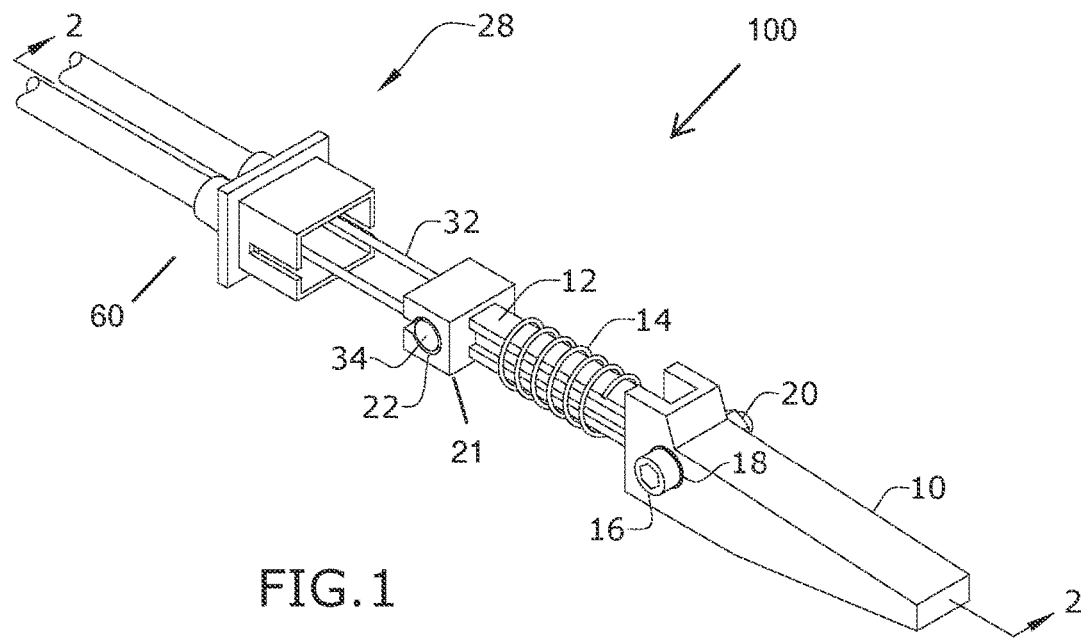
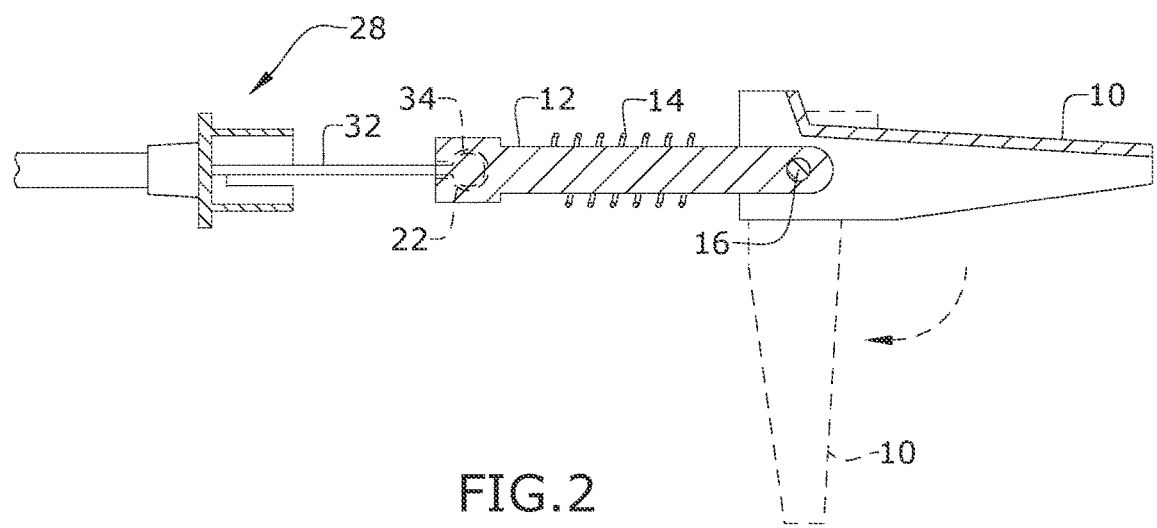

MANUALLY OPERATED CHOKE LEVER ASSEMBLIES INCORPORATING A CABLE SYSTEM

CROSS-REFERENCE TO RELATED APPLICATION

This application claims the benefit of priority of U.S. provisional application No. 62/704,989, filed 5 Jun. 2020, the contents of which are herein incorporated by reference.

BACKGROUND OF THE INVENTION

The present invention relates to choke lever assemblies and, more particularly, an improvement to current snowmobile choke lever assemblies that use a manual style choke system incorporating a single, double or triple cable system.

A choke valve in the carburetor of internal combustion engines is purposed to restrict the flow of air, thereby enriching the fuel-air mixture while starting the engine. In some designs, the choke valve can be activated manually by the operator of the engine via a lever or pull handle or "choke lever assembly". Choke valves are important for naturally-aspirated gasoline engines because small droplets of gasoline do not evaporate well within a cold engine. By restricting the flow of air into the throat of the carburetor, the choke valve reduces the pressure inside the throat, which causes a proportionally-greater amount of fuel to be pushed from the main jet into the combustion chamber during cold-running operation. Once the engine is warm (from combustion), opening the choke valve restores the carburetor to normal operation, supplying fuel and air for efficient combustion.

Choke valves are still common in other internal-combustion applications, including most small portable engines, motorcycles, small propeller-driven airplanes, riding lawn mowers, and snowmobiles.

The existing snowmobile choke lever assembly is made of plastic that over time and use will become brittle and break. When the choke assembly lever breaks, the rider is forced, possibly in a pinch, to find other means of choking the carburetor to start the engine and/or warm up.

As can be seen, there is a need for an improvement to the snowmobile choke lever assembly that uses a manual style choke system incorporating a single, double or triple cable system, sometimes referred to as a lift pull on/off assembly. The present invention embodies an improved choke lever assembly adapted to be stronger and last longer, and ideally designed for snowmobiles. Due to the design disclosed herein, the present invention does not break as easily as the prior art, and so is much more sustainable than current snowmobile choke lever assemblies.

SUMMARY OF THE INVENTION

In one aspect of the present invention, a choke lever assembly including the following: a choke cable assembly operably associated with a choke lever; the choke lever pivotably connected to a distal end of a stem in such a way as to be movable between a first position and a second position; and a proximal end of the stem connects to a socket body of the choke cable assembly, wherein the choke lever is made from a metallic material, wherein the stem and the socket body are made from a metallic material; further including an actuating element operatively associating the stem and the choke lever in such a way to urge the choke lever to the first position from the second position, wherein certain embodiments the actuating element is a spring, wherein the socket body provides lateral access ports for each cable end of the choke cable assembly or wherein the socket body provides upper access ports for each cable end of the choke cable assembly.

In another aspect of the present invention, a method of retrofitting a snowmobile originally having a plastic choke lever assembly, the method includes selecting from the at least two types of metallic choke lever assembly depending on whether the snowmobile has a double choke cable assembly or a triple choke cable assembly; removing the plastic choke lever assembly; and connecting said metallic choke lever assembly so that cable ends of said choke cable assembly operatively associate with the socket body.

These and other features, aspects and advantages of the present invention will become better understood with reference to the following drawings, description and claims.

BRIEF DESCRIPTION OF THE DRAWINGS

FIG. 1 is a perspective view of an exemplary embodiment of a double choke lever assembly of the present invention;

FIG. 2 is a section view of an exemplary embodiment of the present invention, taken along line 2-2 in FIG. 1;

DETAILED DESCRIPTION OF THE INVENTION

Figure 3:
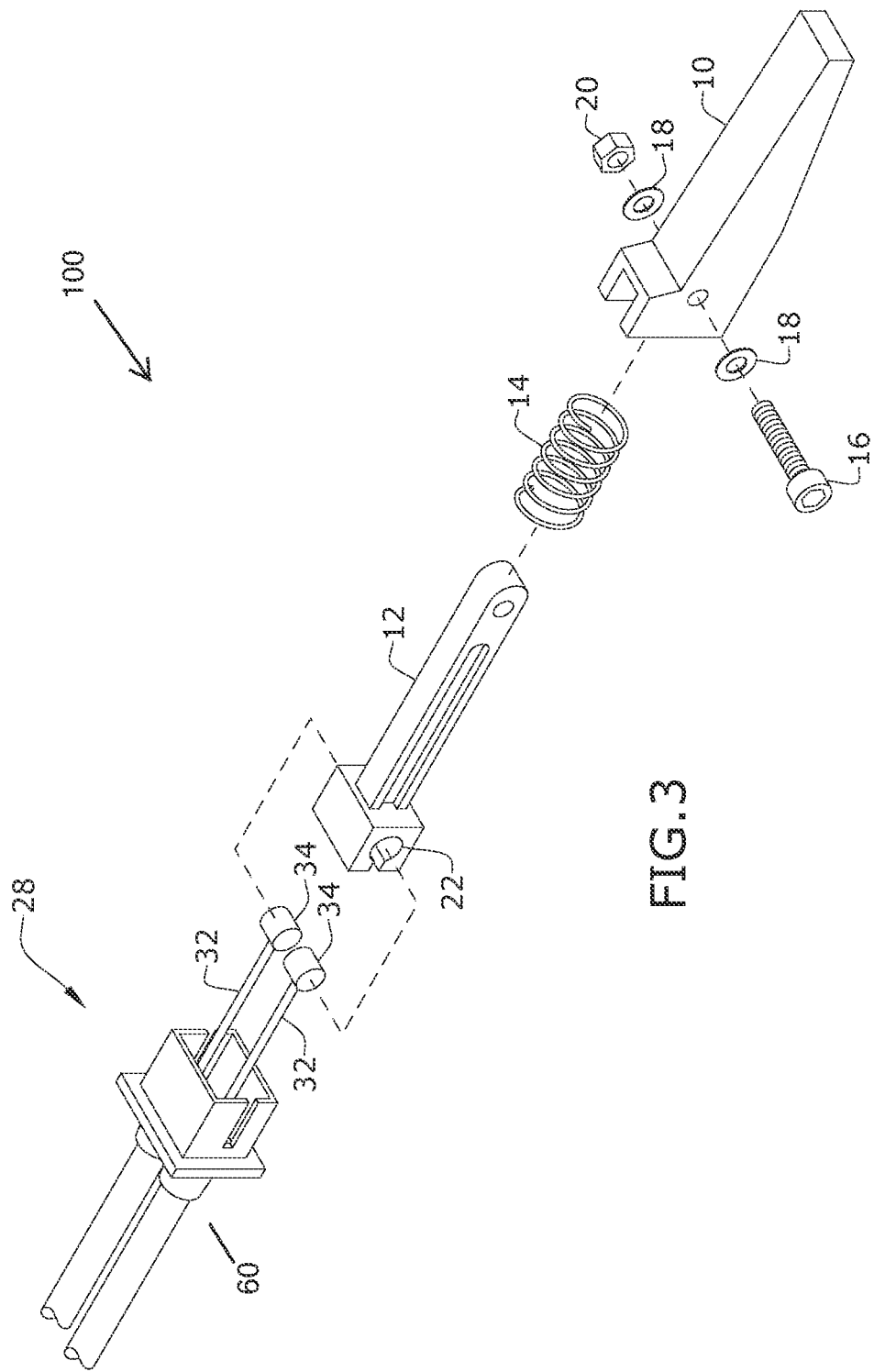
FIG. 3 is an exploded perspective view of an exemplary embodiment of the double choke lever assembly of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

It should be understood by those skilled in the art that the use of directional terms such as upper, lower, lateral, and the like are used in relation to the illustrative embodiments as they are depicted in the figures. Specifically, the upper direction being toward the top margin of FIG. 2, the lower direction being toward the bottom of FIG. 2, and the lateral direction being directed into and/or out of the drawing sheet of FIG. 2.

Broadly, an embodiment of the present invention provides an improvement to manually operated choke lever lift assemblies incorporating a cable system; specifically, the present invention improves snowmobile choke lever lift pull on/off assemblies that use a manual style choke system incorporating a single, double or triple cable system. The sockets that engage the cables of the cable system may be provide lateral or upper access ports. The choke lever at the distal end of the assembly may be movable from a first position to a second position by engaging the cable system, wherein an actuating element returns the choke lever to the first position. The present invention affords replacement of existing choke lever assemblies, wherein the choke lever and other components of the present invention may be made from metallic materials that increase the assembly's durability and half-life.

Figure 4:
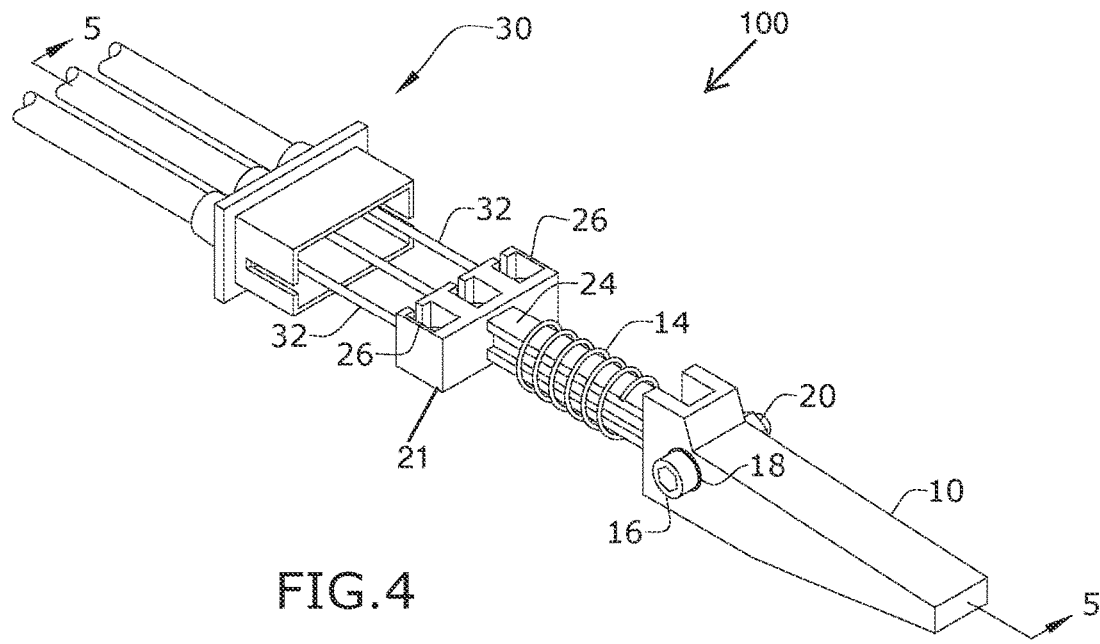
FIG. 4 is a perspective view of an exemplary embodiment of a triple choke lever assembly of the present invention.
Figure 5:
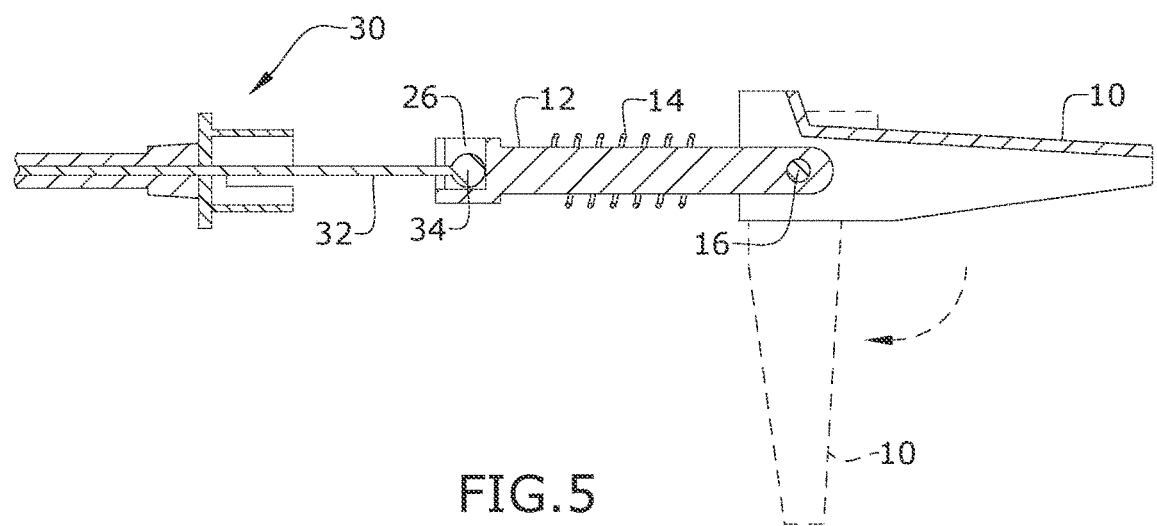
FIG. 5 is a section view of an exemplary embodiment of the present invention, taken along line 5-5 in FIG. 4.

Referring now to FIGS. 1 through 6, the present invention may include a choke lever assembly 100 for manually operated choke systems incorporating single or plurality cable systems. It being understood that single or quadruple cable systems could be improved similarly as the double and triple choke cable assemblies 28 or 30. The choke lever assembly 100 may include a choke lever 10 pivotably coupled to a distal end of a cable stem 12 or 24 in such a way as to be movable between a first position and a second position, as illustrated in FIGS. 2 and 5. Movement to the second position may be through engaging the choke cable assemblies 28 or 30. The pivotable connection may be afforded in numerous ways including but not limited to a pivot pin 16 and fasteners 18 and 20 for securing the pivot pin 16 to the choke lever 10. An actuating element 14, including but not limited to a return spring, may be operatively associated with the choke lever 10 and the cable stem 12 or 24 so that when the choke cable assembly 28 or 30 is not engaged, the choke lever 10 is urged or biased in the first position. In certain embodiments, the second position activates the actuating element 14 to urge the choke lever 10 back to the first position. It being understood that the first position and the second position may be associated with an open and closed condition of a choke valve. It is also understood that the present invention may be used for other valve engagements—for example, the present invention can be used as a throttle lever for engaging a clutch.

The choke cable assemblies 28 or 30 may be operatively associated with the cable stem 12 or 24 so that when the choke cable assembly 28 or 30 is engaged, in certain embodiments, by way of a manually operated sub-assembly 60, the choke lever 10 is movable between the first and second positions.

Referring to FIGS. 1 through 3, the double choke cable assembly 28 may embody a double stem configuration wherein each distal end 34 of each cable 32 nests in a cable end socket 22 accessed laterally. In other words, the body 21 defining the cable end sockets 22 is closed off from the top or upper direction. Accordingly, the distal ends 34 have to be slid/nested into sockets 22 from the side or laterally. The sockets 22 communicate via cable passageways in a direction orthogonal to the lateral access ports through a smaller space to allow the cables 32 to pass therethrough. The sockets 22 being more voluminous than the passageway because the distal ends 34 are accordingly more voluminous that the cable 32.

Figure 6:
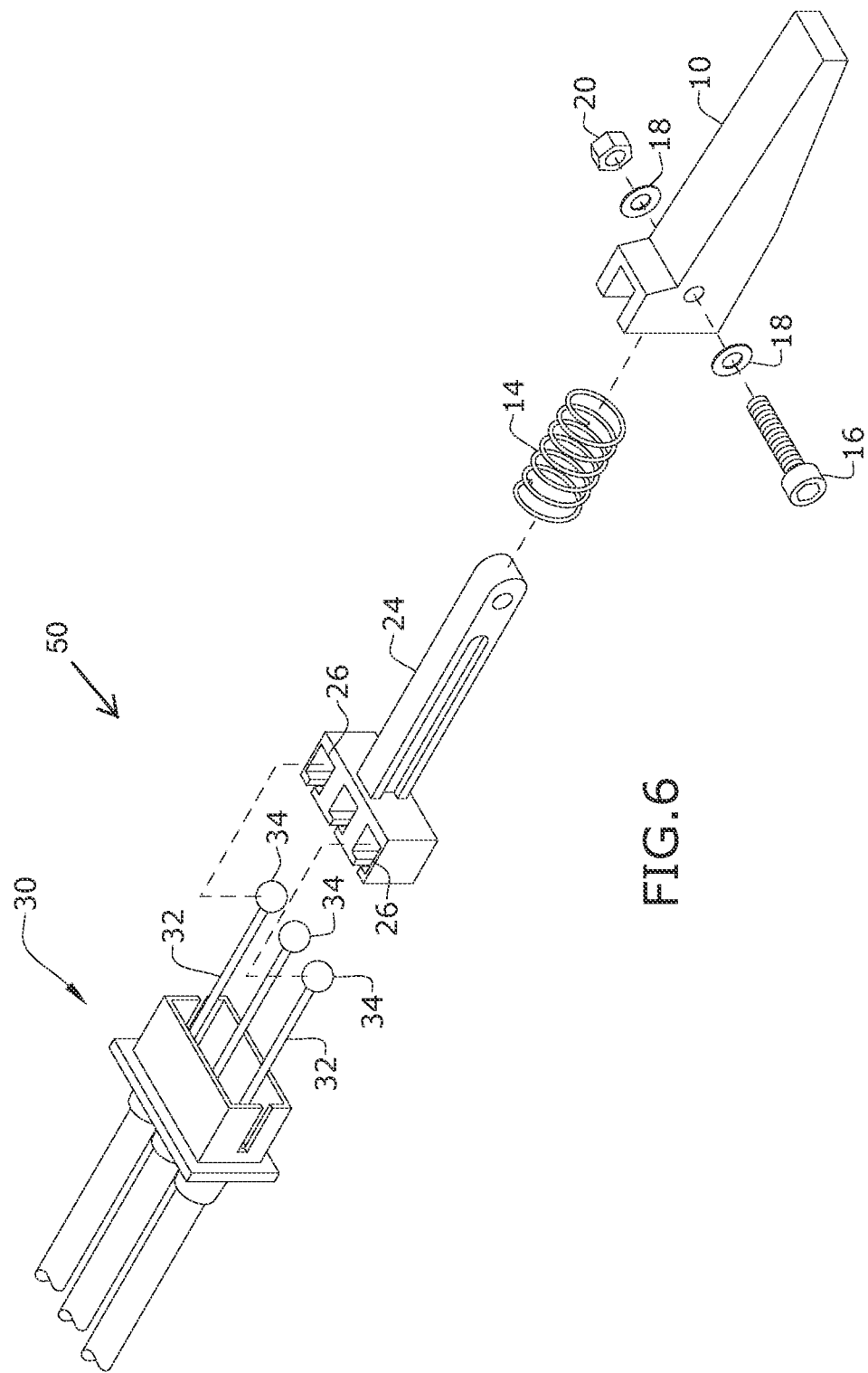
FIG. 6 is an exploded perspective view of an exemplary embodiment of the triple choke lever assembly of the present invention.

Referring to FIGS. 4 through 6, the triple choke cable assembly 30 may embody a triple stem configuration wherein each distal ends/mass/ball 34 of each cable 32 nests in a cable end socket 26 accessed from an upward direction. In other words, the body 21 defining the cable end sockets 26 is closed off from the sides (or laterally closed off). Accordingly, the distal ends 34 have to be slid/nested into sockets 26 from the upper direction. The sockets 26 communicate via cable passageways in a direction orthogonal to the upper access ports through a smaller space to allow the cables 32 to pass therethrough. The sockets 26 being more voluminous than the passageway because the distal ends/mass/ball 34 are accordingly more voluminous that the cable 32.

All of the above-mentioned components may be made from metallic materials, thereby affording more durability and thus longer lifetimes compared to the prior art.

The present invention is contemplated for either new construction or retrofitting to pre-existing machines. In either case, the sub-assembly 60 may be covered by the cable housing, and the sub-assembly 60 may be installed back through the panel of the machine (e.g., snowmobile) so that the driver can manually engage the choke cable assemblies 28 or 30, for instance through a pull handle (not shown). In retrofitting environments, wherein the present invention would just simply replace the existing assembly with some simple tool, the pre-existing fasteners may hold the sub-assembly 60 in place, and the new choke lever 10 can be attached to the stem 12 or 24 using the fasteners 16, 18 and 20 to tighten. The fasteners 18 and 20 may include but are not necessarily limited to a Bolt, 2× washers and the locking nut, respectively. All the components perform a function for the correct operation of the choke lever assembly 28 or 30: the metal cable stem 12 or 24 holds the cables 32 in place while the actuating element 14 is used as a return mechanism for the choke lever 10.

It should be understood, of course, that the foregoing relates to exemplary embodiments of the invention and that modifications may be made without departing from the spirit and scope of the invention as set forth in the following claims.

What is claimed is:

1. A choke lever assembly for retrofitting through a panel of a snowmobile so that a driver manually engages a choke cable assembly comprising cable ends, comprising:
    a choke lever operably associated with the choke cable assembly;
    the choke lever pivotably connected to a distal end of a stem in such a way as to be movable between a first position and a second position;
    a proximal end of the stem connects to a socket body of the choke cable assembly, wherein the choke lever is made from a metallic material; and
    an actuating element operatively associating the stem and the choke lever in such a way to urge the choke lever to the first position from the second position, wherein the socket body provides upper access ports for receiving each cable end of the choke cable assembly, wherein each upper access port communicates a socket of the socket body to an external environment in a vertically upward direction as defined by the snowmobile.

2. The choke lever assembly of claim 1, wherein the stem and the socket body are made from a metallic material.

3. The choke lever assembly of claim 1, wherein the actuating element is a spring.

4. A method of retrofitting a snowmobile originally having a plastic choke lever assembly, the method comprising:
    selecting a metallic choke lever assembly of claim 1 if the snowmobile has a triple choke cable assembly;
    removing the plastic choke lever assembly; and
    connecting said metallic choke lever assembly so that cable ends of said choke cable assembly operatively associate with the socket body by urging the cable ends vertically downward through said upper access ports.

* * * * *